United States Patent
Birman et al.

(10) Patent No.: US 10,576,883 B2
(45) Date of Patent: Mar. 3, 2020

(54) DIAL GAUGE WITH CHAPLET TICK MARK ILLUMINATION

(71) Applicant: Continental Automotive Systems, Inc., Auburn Hills, MI (US)

(72) Inventors: Vyacheslav Birman, Auburn Hills, MI (US); Kevin Michael Dyer, Macomb Township, MI (US); Tian Bai, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/967,881

(22) Filed: May 1, 2018

(65) Prior Publication Data

US 2019/0337448 A1    Nov. 7, 2019

(51) Int. Cl.
*B60Q 3/14* (2017.01)
*B60Q 3/66* (2017.01)
*G01D 13/16* (2006.01)
*G01D 11/28* (2006.01)

(52) U.S. Cl.
CPC ........... *B60Q 3/14* (2017.02); *B60Q 3/66* (2017.02); *G01D 11/28* (2013.01); *G01D 13/16* (2013.01)

(58) Field of Classification Search
CPC . B60Q 3/14; B60Q 3/66; G01D 11/28; G01D 13/16
See application file for complete search history.

(56) References Cited

U.S. PATENT DOCUMENTS

| | | | | |
|---|---|---|---|---|
| 4,935,850 A | * | 6/1990 | Smith, Jr. | G01D 7/00 362/23.01 |
| 2006/0236915 A1 | * | 10/2006 | Baba | G01D 11/28 116/286 |
| 2015/0096487 A1 | * | 4/2015 | Mochizuki | G01D 13/18 116/286 |

* cited by examiner

*Primary Examiner* — Kevin Quarterman
(74) *Attorney, Agent, or Firm* — Continental Automotive Systems, Inc.

(57) ABSTRACT

A gauge assembly includes a dial face including a plurality of printed indicia. A plurality of illuminable chaplet tick marks extend through openings in the dial face. The dial face includes dark outlines around a perimeter of each of the openings for reducing a luminance of each of the chaplet tick marks. A method is also disclosed.

11 Claims, 3 Drawing Sheets

DIAL GAUGE WITH CHAPLET TICK MARK ILLUMINATION

TECHNICAL FIELD

The present disclosure relates to dial gauges for vehicle instrument panels and clusters that include illuminated tick marks, and more specifically to a dial gauge with features for regulating tick mark luminance.

BACKGROUND

Vehicles include instrument panels to communicate information indicative of vehicle operation and performance to an operator. The instrument panel can include several gauges and dials that communicate vehicle conditions such as speed, engine rpm, temperature, oil pressure along with many other operational parameters. Some gauges include illuminated indicators referred to as tick marks that are provided at specific increments along the gauge face. The tick marks are part of a light guide disposed under the gauge face. The light guide includes features for uniformly providing light to each tick mark. However, in some instances, features on the light guide are not able to provide a desired illumination uniformity.

Automotive original equipment suppliers continually strive to improve quality, reduce costs and maintain customer interest with new products and aesthetic design features.

SUMMARY

In a disclosed gauge assembly embodiment, a dial face includes a plurality of printed indicia and a plurality of illuminable tick marks extend through openings in the dial face and the dial face includes an outline around a perimeter of each of the openings for reducing a luminance of each of the tick marks.

In further embodiment of the forgoing gauge assembly, the outline includes a width that is uniform about the perimeter of each of the openings.

In further embodiment according to any of the foregoing gauge assemblies, the outline extends to the edge of each of the openings.

In further embodiment according to any of the foregoing gauge assemblies, the width is the same for each outline about each of the openings.

In further embodiment according to any of the foregoing gauge assemblies the width of at least one of the outlines is different than at least one of the other outlines.

In further embodiment according to any of the foregoing gauge assemblies, the outline is spaced apart from the plurality of printed indicia.

In further embodiment according to any of the foregoing gauge assemblies, the plurality of tick marks are part of a light guide disposed below the dial face.

In further embodiment according to any of the foregoing gauge assemblies, a light housing supports the light guide below the dial face.

In further embodiment according to any of the foregoing gauge assemblies, the dial face includes a translucent white print area and the plurality of indicia and the outline are printed onto the white print area.

In further embodiment according to any of the foregoing gauge assemblies, the light guide illuminates each of the plurality of tick marks simultaneously.

In further embodiment according to any of the foregoing gauge assemblies, the plurality of printed indicia are formed from a material applied to the dial face.

In another disclosed embodiment, a method of assembling a dial gauge assembly includes mounting a light guide including a plurality of illuminable tick marks relative to a dial gauge face such that each of the plurality of illuminable tick marks extend through a corresponding opening through the dial gauge and depositing an outline around a perimeter of the opening for each of the plurality of illuminable tick marks for regulating a luminance.

In another embodiment according to the foregoing method, a plurality of indicia is printed on the dial face to define a scale and spacing the outline apart from the plurality of indicia.

In another embodiment according to any of the foregoing methods, the outline is deposited to an edge of each of the openings.

In another embodiment according to any of the foregoing methods, the outline is deposited with a width that is the same for each of the outlines around each of the openings.

In another embodiment according to any of the foregoing methods, the outline is deposited around one of the openings with a first width that is different than a second width of another of the openings.

In another embodiment according to any of the foregoing methods, the outline is deposited from a material the same as the plurality of indicia and at a common thickness.

In another embodiment according to any of the foregoing methods, a light housing is assembled below the light guide.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
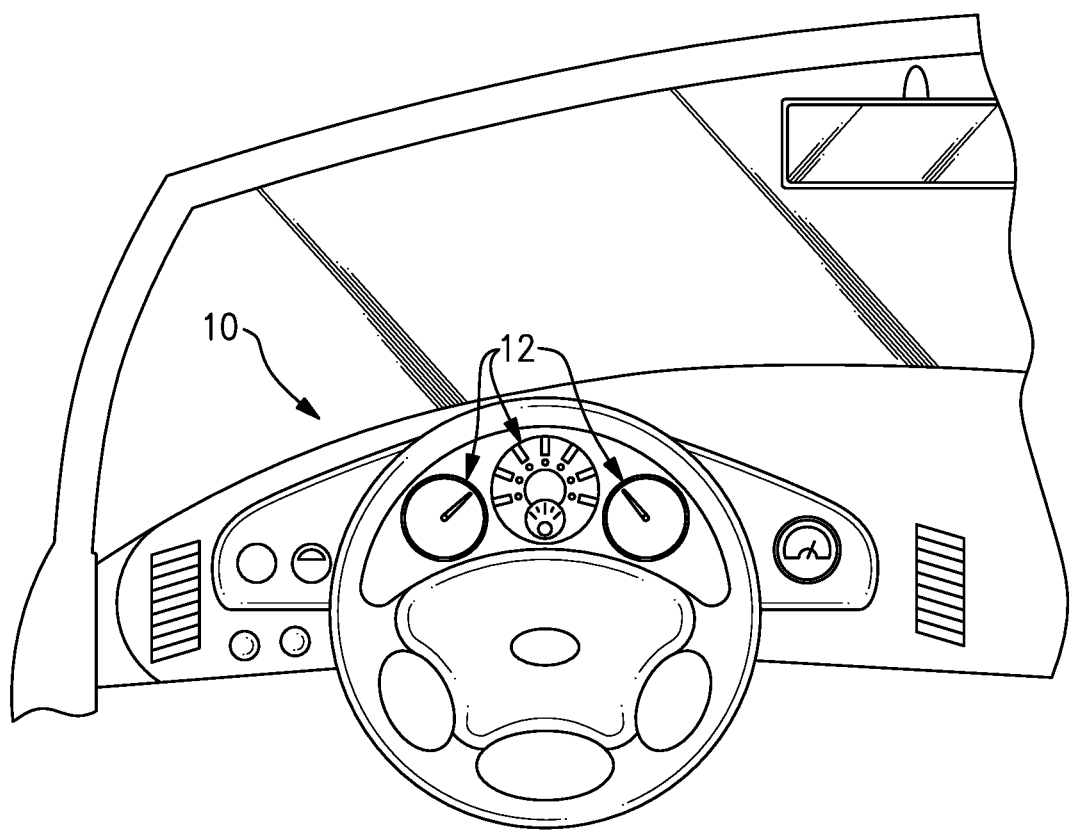
FIG. 1 is a schematic view of an instrument panel including several dial gauges.

Referring to FIG. 1, a vehicle instrument panel 10 includes a plurality of dial gauges 12. The dial gauges 12 include indicia such as numeric scales and marks that communicate vehicle performance to a vehicle operator. The example dial gauges 12 are illuminated and include features to provide a uniform illumination.

Figure 2:
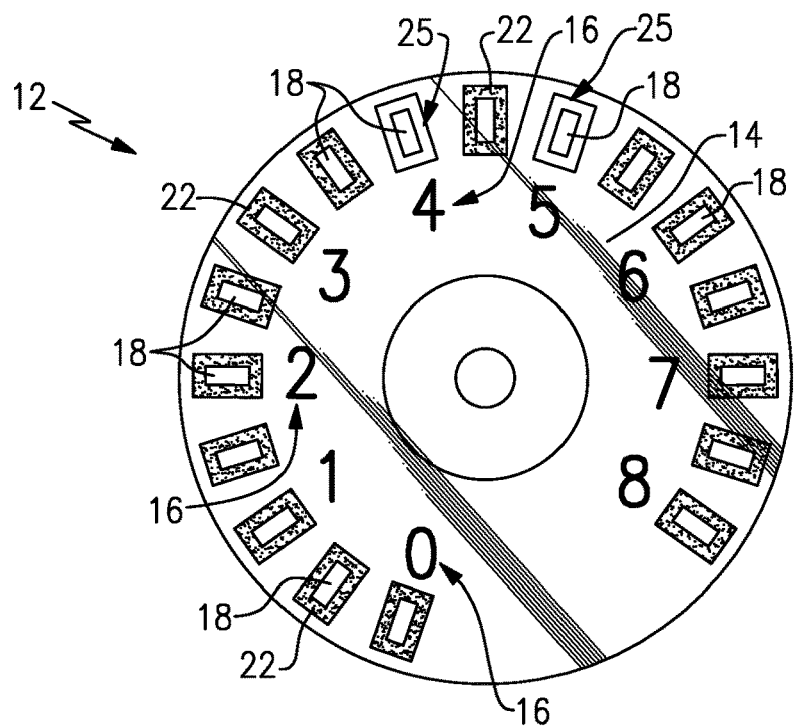
FIG. 2 is a schematic view of an example dial gauge embodiment.

Referring to FIG. 2 with continued reference to FIG. 1, one of the example dial gauges 12 is illustrated and includes indicia that in this disclosed example is a plurality of reference numerals 16 that are printed onto a dial face 14. The example printing on the dial face 14 is a black material adhered to the dial face 14. The dial gauge 12 includes a plurality of illuminable chaplet tick marks 18 disposed relative to the printed reference numerals 16. Each of the tick marks 18 are arranged to correspond to one of the reference numerals 16 and intermediate positions between the reference numerals 16. The tick marks 18 are illuminable to provide a desired aesthetic appearance of the dial gauge 12.

Figure 3:
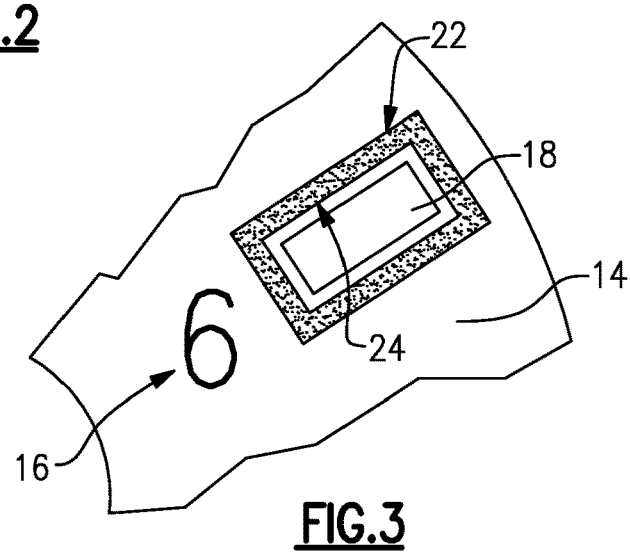
FIG. 3 is an enlarged view of a portion of a dial gauge face embodiment.

Referring to FIG. 3 with continued reference to FIG. 2, each of the illuminable tick marks 18 are a part of a light guide 30 that is supported below the dial face 14. The tick marks 18 extend from the light guide 30 through openings 20 in the dial face 14 and are visible features of the dial gauge 12. The openings 20 in the dial face 14 are larger than the tick mark 18 such that a clearance fit is provided between an inner perimeter 24 of the opening 20 and the tick mark 18. The space or gap between the inner perimeter 24 and the tick mark 18 can allow light from the light guide 30 to be visible on the dial face 14. Moreover, although the light guide 30 includes features for uniformly dispensing light to each of the tick marks 18, in some circumstances, the tick marks 18 may not appear completely uniform.

A printed outline 22 is disposed on the dial face 14 around the perimeter of each opening 20. The example outline 22 is printed in a black material to reduce the perceived luminance of the corresponding tick mark 18. In one example, the outline is of the same material and color used to print the numerals 16. It should be appreciated, that although black is disclosed by way of example, other dark colors of material that can provide a desired reduction in perceived luminance are within the scope and contemplation of this disclosure.

In some circumstances, the illumination from the tick mark 18 is such that a black outline 22 is not needed to provide the desired illumination. In the example dial face 14 illustrated in FIG. 2, numerals 4 and 5 include a boarder 25 that does not include an outline 22. In this example with regard to numerals 4 and 5, the width of the outline can be described as zero.

Figure 4:
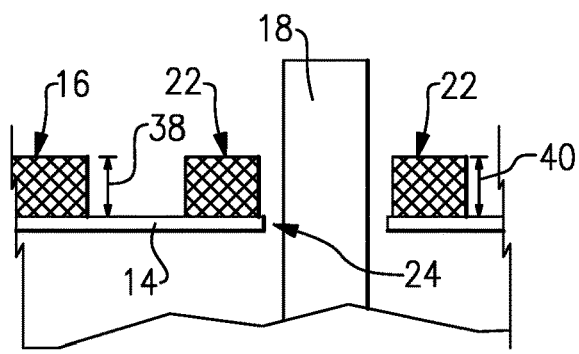
FIG. 4 is a cross-section of a portion of the example dial gauge.
Figure 5:
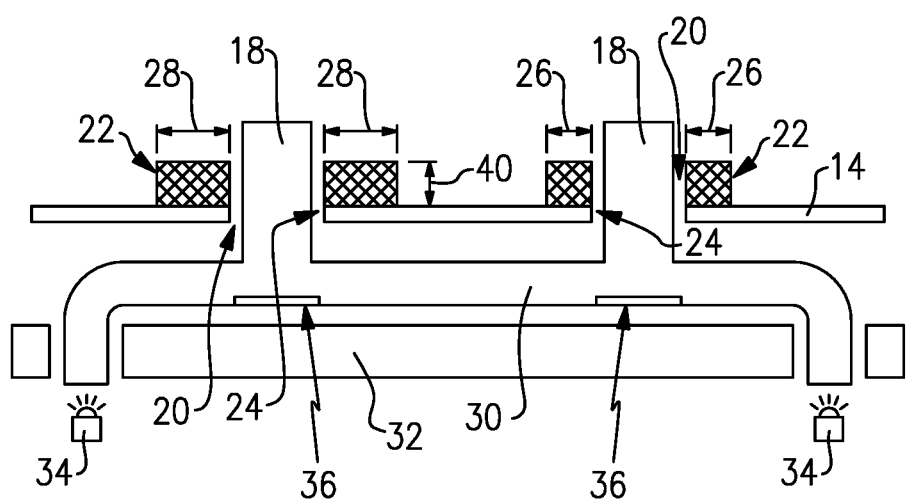
FIG. 5 is a cross-sectional view of another portion of the example dial gauge.

Referring to FIGS. 4 and 5 with continued reference to FIG. 3, uniform lighting around the dial face 14 and from tick mark 18 to tick mark 18 provides a perceived aesthetic appearance of uniformity to reinforce the perception of manufacture quality. Light from light sources 34 is directed into the light guide 30. The light guide 30 directs the light into each of the tick marks 18. A light housing 32 is provided to block light from being seen that is not transmitted through the light guide 30.

The light guide 30 includes structural features and textures that provide a substantially uniform transmission of light to each of the tick marks 18 regardless of location or distance from one of the light sources 34. In the disclosed example, a textured surface 36 is provided to aid in spreading and evenly distributing light. However, in some instances even the modification and structure of the light guide 30 is not sufficient to provide the uniformity desired.

Accordingly, the example dial face 14 includes the outline 22 about at least a portion of the perimeter 24 of each of the openings 20 for the tick marks 18. In this example, the outline is a black material but other dark material could also be utilized and are within the contemplation of this disclosure. The dark outline 22 reduces the amount of perceived luminance of the tick mark 18 extending through the corresponding opening 20. It should be understood, that although the example disclosed outlines are provided entirely around the openings 20, that it is within the contemplation and scope of this disclosure that the outline 22 may only extend partially about the perimeter 24. Moreover, the outline 22 may include separate sections disposed at different parts of the perimeter 24.

The outline 22 is formed of the same material utilized to form the numerals 16 on the dial face 14. The outline 22 is spaced apart from the numerals 16 such that it does not interfere with visible reference and recognition of the individual numerals 16. Moreover, the outline 22 is applied at a thickness 40 common to a thickness 38 of material surrounding the numerals 16. In other example embodiment, the thickness 40 of the reference numerals 16 is different than a thickness 40 of the outline 22.

The outlines 22 are provided about the perimeter 24 of each opening 20 to even out the luminance directed through each of the plurality of tick marks 18 and provide the perception of uniform illuminants. In one example embodiment, each of the outlines 22 include a common width 28. The common width 28 reduces the amount of luminance projected by each tick mark 18 to provide a desired uniform appearance.

In another example embodiment, each of the tick marks 18 include the black outline 22 with widths that may vary depending on the amount of reduction and light intensity required. In this example, a first width 28 of the outline 22 is shown disposed around one tick mark 18 and another outline 22 includes second width 26. The first width 28 is wider than the second width 26. The differing widths 26, 28 of the outline 22 are provided at a width determined to reduce perceived light intensity from a corresponding one of the tick marks 18 an amount tailored to that specific tick mark 18. Tailoring of the widths 26, 28 enables tailoring of luminance for each of the tick marks 18 to provide a uniform luminance for all of the tick marks of a dial gauge 12. Additionally, the width may vary within one outline.

Accordingly, the example dial gauge includes outlines around each tick mark to dim the light intensity for each tick mark and provide a uniform luminance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:
1. A gauge assembly comprising:
a dial face including a plurality of printed indicia, wherein each of the plurality of printed indicia is formed from a first material applied to the dial face at a first thickness; and
a plurality of illuminable tick marks extending through openings in the dial face; and a dark outline formed from a second material applied to the dial face at the first thickness around at least a portion of a perimeter of at least one of the openings for reducing a luminance of a corresponding one of the plurality of tick marks, wherein the dark outline is spaced apart from the printed indicia and the second material is the came as the first material.

2. The gauge assembly as recited in claim 1, wherein the dark outline includes a width that is uniform about the perimeter for each of the at least one of the openings.

3. The gauge assembly as recited in claim 2, wherein the dark outline extends to the edge of the at least one of the openings.

4. The gauge assembly as recited in claim 3, wherein the width is the same for each dark outline about each of the openings.

5. The gauge assembly as recited in claim 4, wherein the width of at least one of the dark outlines is different than at least one of the other dark outlines.

6. The gauge assembly as recited in claim 3, wherein the dark outline is spaced apart from the plurality of printed indicia.

7. The gauge assembly as recited in claim 1, wherein the plurality of tick marks are part of a light guide disposed below the dial face.

8. The gauge assembly as recited in claim 7, including a light housing supporting the light guide below the dial face.

9. The gauge assembly as recited in claim 8, wherein the dial face includes a translucent white print area and the plurality of indicia and the dark outline are printed onto the white print area.

10. The gauge assembly as recited in claim 7, wherein the light guide illuminates each of the plurality of tick marks simultaneously.

11. The gauge assembly as recited in claim 1, wherein the dark outline includes a width that is non-uniform about the perimeter for each of the at least one of the openings.

\* \* \* \* \*